(12) United States Patent
Colbert et al.

(10) Patent No.: US 7,469,510 B2
(45) Date of Patent: Dec. 30, 2008

(54) SYSTEM USING A DRYWALL BOARD AND A JOINTING COMPOUND

(75) Inventors: Elizabeth Colbert, Newark, DE (US); Andrew B. Bingaman, Dillsburg, PA (US); Marc Domenech, La Roque sur Pernes (FR); Pierre Gagné, Varennes (CA); Kenneth B. O'Connor, Ashburn, VA (US); Göran Hedman, Rochefort du Gard (FR); Stuart Jacquet, Cabries (FR)

(73) Assignee: LaFarge Platres, Avignon, Cedex (FR)

( * ) Notice: Subject to any disclaimer, the term of this patent is extended or adjusted under 35 U.S.C. 154(b) by 498 days.

(21) Appl. No.: 10/824,193

(22) Filed: Apr. 14, 2004

(65) Prior Publication Data
US 2005/0229519 A1    Oct. 20, 2005

(51) Int. Cl.
E04B 2/00    (2006.01)
E04G 23/00    (2006.01)

(52) U.S. Cl. .................. 52/419; 52/741.41; 52/416

(58) Field of Classification Search .............. 52/416, 52/415, 419, 741.41
See application file for complete search history.

(56) References Cited

U.S. PATENT DOCUMENTS

| | | |
|---|---|---|
| 1,439,289 A | 12/1922 | Buttress |
| 1,993,472 A | 3/1935 | Borsari-Fischer |
| 2,109,719 A | 3/1938 | Brusse |
| 2,205,423 A | 6/1940 | Lefubre |
| 2,754,795 A | 7/1956 | Enssle |
| 2,770,216 A | 11/1956 | Schock |
| 2,833,139 A | 5/1958 | Bosshard |
| 2,925,631 A | 2/1960 | Larson et al. |
| 3,003,979 A | 10/1961 | Ptasienski et al. |
| 3,180,058 A | 4/1965 | Tillisch et al. |
| 3,256,223 A | 6/1966 | Heijmer |
| 3,284,980 A | 11/1966 | Dinkel |
| 3,303,147 A | 2/1967 | Elden |
| 3,382,119 A | 5/1968 | Henkel |
| 3,411,926 A | 11/1968 | Gogek et al. |
| 3,422,587 A | 1/1969 | Murray |
| 3,576,091 A | 4/1971 | Shull, Jr. et al. |
| 3,630,742 A | 12/1971 | Crawford et al. |
| 3,708,935 A | 1/1973 | Kossuth et al. |
| 3,819,395 A | 6/1974 | Yocum |
| 3,835,074 A | 9/1974 | Desmarais |
| 3,907,725 A | 9/1975 | Forte et al. |
| 3,975,320 A | 8/1976 | Lane et al. |
| 3,984,596 A | 10/1976 | Failmezger |
| 4,018,732 A | 4/1977 | Lakshmanan |
| 4,117,183 A | 9/1978 | Long |
| 4,178,273 A | 12/1979 | Brown |
| 4,205,041 A | 5/1980 | Hymes |
| 4,238,239 A | 12/1980 | Brown |
| 4,287,103 A | 9/1981 | Francis et al. |
| 4,294,622 A | 10/1981 | Brown |
| 4,448,639 A | 5/1984 | Long |
| 4,454,267 A | 6/1984 | Williams |
| 4,558,079 A | 12/1985 | Desmarais |
| 4,579,610 A | 4/1986 | Kole et al. |
| 4,657,594 A | 4/1987 | Struss |
| 4,661,164 A | 4/1987 | Severinghaus, Jr. et al. |
| 4,672,787 A | 6/1987 | Murphy |
| 4,686,253 A | 8/1987 | Struss et al. |
| 4,720,303 A * | 1/1988 | Soldatos .................. 106/181.1 |
| 4,725,477 A | 2/1988 | Kole et al. |
| 4,743,475 A | 5/1988 | Negri et al. |
| 4,820,754 A | 4/1989 | Negri et al. |
| 4,845,152 A | 7/1989 | Palmer |
| 4,859,248 A | 8/1989 | Thaler et al. |
| 4,959,272 A | 9/1990 | Long |
| 4,965,031 A | 10/1990 | Conroy |
| 4,972,013 A | 11/1990 | Koltisko, Jr. et al. |
| 4,988,543 A | 1/1991 | Houle et al. |
| 5,019,195 A | 5/1991 | Skinner |
| 5,039,341 A | 8/1991 | Meyer |
| 5,055,323 A | 10/1991 | Kole et al. |
| 5,079,042 A | 1/1992 | Frings |
| 5,088,260 A | 2/1992 | Barton et al. |

(Continued)

FOREIGN PATENT DOCUMENTS

AU    19322/92    1/1993

(Continued)

OTHER PUBLICATIONS

J.R. Gorman, et al., "Plaster and Drywall Systems Manual," BNI Books, Division of Building News, Inc., Apr. 12, 2003, pp. 240 and 251.

(Continued)

Primary Examiner—Richard E Chilcot, Jr.
Assistant Examiner—Elizabeth A Plummer
(74) Attorney, Agent, or Firm—Buchanan Ingersoll & Rooney PC

(57) ABSTRACT

Coating and jointing material systems for wall construction are provided. The coating is applied to drywall elements prior to installation and is compatible with the jointing materials such that a substantially homogeneous surface may be obtained after the drywall elements are assembled with jointing material and the jointing material is dried. Methods for the construction of interior walls and interior construction systems are provided.

35 Claims, No Drawings

U.S. PATENT DOCUMENTS

| | | | |
|---|---|---|---|
| 5,102,462 A | 4/1992 | Podlas |
| 5,143,757 A | 9/1992 | Skinner |
| 5,207,830 A | 5/1993 | Cowan et al. |
| 5,230,200 A | 7/1993 | Douglas et al. |
| 5,258,069 A | 11/1993 | Knechtel et al. |
| 5,277,712 A | 1/1994 | McInnis |
| 5,334,243 A | 8/1994 | Hyman |
| 5,336,318 A | 8/1994 | Attard et al. |
| 5,487,250 A | 1/1996 | Yount et al. |
| 5,552,187 A | 9/1996 | Green et al. |
| 5,653,797 A | 8/1997 | Patel |
| 5,714,032 A | 2/1998 | Ainsley et al. |
| 5,746,822 A | 5/1998 | Espinoza et al. |
| 5,779,786 A | 7/1998 | Patel |
| 5,869,166 A | 2/1999 | Caldwell |
| 5,908,521 A | 6/1999 | Ainsley et al. |
| 5,922,447 A | 7/1999 | Baig |
| 5,945,198 A | 8/1999 | Deodhar et al. |
| 5,987,835 A | 11/1999 | Santarossa |
| 6,077,966 A | 6/2000 | Matsumura et al. |
| 6,105,325 A | 8/2000 | Zuber et al. |
| 6,106,607 A | 8/2000 | Be et al. |
| 6,165,261 A | 12/2000 | Wantling |
| 6,171,388 B1 | 1/2001 | Jobbins |
| 6,177,180 B1 | 1/2001 | Bodine et al. |
| 6,221,521 B1 | 4/2001 | Lynn et al. |
| 6,238,476 B1 | 5/2001 | Sprinkle |
| 6,268,042 B1 | 7/2001 | Baig |
| 6,436,185 B1 | 8/2002 | Ayambem et al. |
| 6,645,291 B2 | 11/2003 | Ayambem et al. |
| 6,663,979 B2 | 12/2003 | Deodhar et al. |
| 6,673,144 B2 | 1/2004 | Immordino, Jr. et al. |
| 6,733,581 B2 | 5/2004 | Langford |
| 7,047,701 B2 | 5/2006 | Bonetto et al. |
| 2002/0086114 A1 | 7/2002 | Madsen |
| 2002/0121326 A1 | 9/2002 | Adler et al. |
| 2003/0084633 A1 | 5/2003 | Zuber et al. |
| 2003/0085306 A1 | 5/2003 | John et al. |
| 2003/0113572 A1 | 6/2003 | Deodhar et al. |
| 2003/0153651 A1 | 8/2003 | Bonetto et al. |
| 2004/0154264 A1 | 8/2004 | Colbert |
| 2004/0209074 A1 | 10/2004 | Randall et al. |
| 2004/0216424 A1 | 11/2004 | Zuber et al. |
| 2004/0237436 A1 | 12/2004 | Zuber et al. |
| 2005/0065256 A1 | 3/2005 | Kyte et al. |
| 2005/0229519 A1 | 10/2005 | Colbert et al. |
| 2005/0234174 A1 | 10/2005 | Colbert et al. |
| 2005/0246993 A1 | 11/2005 | Colbert et al. |
| 2005/0252128 A1 | 11/2005 | Colbert et al. |
| 2006/0048684 A1 | 3/2006 | Bonetto et al. |

FOREIGN PATENT DOCUMENTS

| | | |
|---|---|---|
| AU | 719427 | 5/2000 |
| CA | 2259115 | 8/1999 |
| DE | 142872 A1 | 7/1980 |
| DE | 37 21 668 A1 | 5/1989 |
| DE | 43 24 315 | 10/1994 |
| DE | 43 31 141 | 3/1995 |
| EP | 0 496 682 A1 | 7/1992 |
| EP | 0 521 804 B1 | 7/1993 |
| EP | 1 182 235 | 2/2002 |
| FR | 2166536 | 8/1973 |
| FR | 2 505 908 | 11/1982 |
| FR | 2 736 079 A1 | 3/1997 |
| FR | 2818635 | 6/2002 |
| FR | 2818968 | 7/2002 |
| GB | 1 513 763 | 6/1978 |
| GB | 2228931 | 9/1990 |
| JP | 60-065197 | 4/1985 |
| JP | 09-109131 | 4/1997 |
| WO | 97/02395 A1 | 1/1997 |
| WO | 99/08979 | 2/1999 |
| WO | 99/48833 | 9/1999 |
| WO | 99/57371 | 11/1999 |
| WO | 00/06518 | 2/2000 |
| WO | 02/06183 | 1/2002 |
| WO | WO 02/06183 A1 | 1/2002 |
| WO | 02/12144 A2 | 2/2002 |
| WO | 02/058902 A2 | 8/2002 |
| WO | 2005/040475 | 5/2005 |

OTHER PUBLICATIONS

The White Book 1986 Edition, British Gypsum, Apr. 12, 2003.
The White Book, Plasterboard Fixing, Jointing and Decorating, British Gypsum, Apr. 12, 2003.
G.D. Plumb, M.A., Lightweight Partitions Having Improved Low Frequency Sound Insulations, Research and Development Department, 10 pages.
9 White, Medium Calcium Carbonate Filler, Georgia Marble Company, May 1996.
Norme Francaise, Methode de Determination d'absorption d'eau, NF Q 03-014, Sep. 1985, pp. 103-108.
Water Absorbency of Bibulous Papers, T 432 cm—99, Approved by the Physical Properties Committee of the Process and Product Quality Division.
Water Absorbency of Bibulous Papers, T 432 om—94, Approved by the Chemical Properties Committee of the Process and Product Quality Division.
A Marquer D'Une Pierre Blanche . . . , 11 pages.
Pregyplac Deco la nouvelle plaque blanche, Lafarge Platres, Juillet 1995.
Standard Conditioning and Testing Atmospheres for Paper, Board, Pulp Handsheets and Related Products, T 402 om—93, Approved by the Physical Properties Committee of the Process and Product Quality Division.
Gypsum Plasterboards, Mar. 1995, 30 pages.
Plaques de Platre—Definitions, Exigences et Methodes d'essai, Oct. 2000, 27 pages.
Papier, Cartons et Pates, Norme Europeenne, Dec. 1993, 10 pages.
Ken A. Phillips, et al., Industrial Minerals in Arizona's Wallboard Joint Cement Industry, Jul. 1989, 6 pages.
Ken Phillips, et al., Industrial Minerals in Southern California's Wallboard Joint Cement Industry, Sep. 1989, 6 pages.
Plaques de Parement en Platre, Oct. 1981, 12 pages.
Gypsum Plasterboard—Part 1: Specification for Plasterboard Excluding Material Submitted to Secondary Operations, 1985, 10 pages.
Travaux de Peinture des Batiments, Partie 1: Cahier des Clauses Techniques, 77 pages.
Dry Lining and Partitioning Using Gypsum Plasterboard, British Standard, 1995, 50 pages.
Sauli Rennes, et al., The Influence of Binders on the Structure and Water Sorption of Coated Paper, Apr. 12, 2003, pp. 698-703.
Technical Data, Calmote Ad, Omya UK.
Attagel 50, Engelhard.
Engelhard Material Safety Data Sheet, Lawrence Industries, Aug. 19, 1992.
Fordamin Stinnes Logistics, Fordacal S2 Talc.
Defoamers for Emulsion Paints and Emulsion Plasters, BYK Chemie, 4 pages.
4 Walocel M Delivery Programme.
Emultex 596, Synthomer International Technology Individual Service.
Sil-Cell 35/34, Silbrico Corporation, 2 pages.
Methocel Cellulose Ethers for Gypsum-Based Building Materials, How Methocel Cellulose Ethers Products Maximise the Performance of Gypsum-based Building Materials.
Elotex LIQ2020, Technical Data Sheet.
Twinstar Chemicals Limited, Benzoflex 9-88 Plasticiser Dipropyleneglycol Dibenzoate, 5 pages.
U.S. Appl. No. 10/824,336, Colbert et al., filed Apr. 14, 2004.
U.S. Appl. No. 10/823,428, Colbert et al., filed Apr. 13, 2004.

U.S. Appl. No. 10/823,419, Gagne et al., filed Apr. 13, 2004.
"ACUMER® 9400—Dispersant for Paper and Paperboard Coatings", Rohm and Haas Company, Special Polymers.
"ACUMER® 9300—Dispersant for Paper and Paperboard Coatings", Rohm and Haas Company, Special Polymers.
George M. Kutcher, Jr., CDT, CSI, "Revisiting the Levels of Gypsum Board Finish", National Gypsum Company, pp. 1-3.
Dan Eklund, "The Influence of Binders and Pigments upon the K&N Ink Absorption of Coated Papers", No. 9, 1973 Papper och Trä.
Chemical Abstracts, vol. 103, No. 8, Aug. 26, 1985, Abstract No. 58270z, pp. 278; XP 000185205; Abstract of JP 60 065197.
Database WPI, Week 199727, AN 1997-293470, XP002198594, Abstract of JP 09 109131.
Derwent WPI AN 1997-109001, Week 199710, Abstract of WO 9702395.
Derwent WPI AN 1989-016493, Week 198903, English Abstract of DE 3721668.
Derwent WPI AN 1993-002309, Week 199301, English Abstract of EP 0521804.
Decision, Jun. 14, 2005, Appeal No. T 1032/03-3.2.3, and translation thereof.
New Zealand Opposition Paper in Patent No. 527112 dated Dec. 18, 2006.
Machine Translation DE 4324315 A (1994).
International Preliminary Examination Report issue in a corresponding PCT application.
Rheological Aspects of Carboxymethyl Cellulose Acetate Butyrate (CMCABTM) in Waterborne Coatings; 8 pages.

* cited by examiner

SYSTEM USING A DRYWALL BOARD AND A JOINTING COMPOUND

FIELD OF THE INVENTION

Compatible coating formulation and jointing material systems for improved drywall installation are provided. A method for constructing interior walls including applying the coating and jointing material systems and interior construction systems formed with the use of the coating and jointing materials are further provided.

BACKGROUND

Interior walls typically are installed by use of flat, prefabricated boards which are assembled with the use of jointing material such as joint compounds, sealing coats, joint coats and/or joint-pointing coats. The prefabricated elements can be gypsum fiberboards, cement fiberboards, gypsum wallboards or plaster boards and the like. The flat, prefabricated boards typically include at least one sheet of lining paper, at least one outer layer of which has a visible outer face ready to be decorated. Generally, in the construction of interior walls, flat prefabricated elements, or drywall elements, are fastened to wall frames by, for example, nails or screws, and the joints taped or plastered with a jointing material. The prefabricated elements are assembled together, optionally with a jointing material and the joints are finished with a sealing coat, joint coat and/or joint-pointing coat, so as to obtain an overall visible outer surface which is relatively uniform or plane, including in the region of the joints.

After the interior assembly work has been completed, the preparation generally involves covering the overall surface obtained, i.e., the lining of the flat prefabricated elements plus the joints, with one or more layers of a paint or priming or finishing coat. The overall visible outer surface of the flat, prefabricated boards typically needs to be prepared, before receiving any surface decoration, such as by application of one or more layers of a film covering of the paint or lacquer type or a wallpaper. This preparation is necessitated especially by the shade or color differences existing between the visible outer surface of the flat prefabricated elements, for example plasterboards, and the visible outer surface of the joints.

The preparation operation represents an appreciable additional cost, for example in a complete process for the construction of a building. And, in some cases, it is still insufficient for obtaining an overall decorated surface of uniform appearance, particularly in view of the physico-mechanical differences prevailing between the joints and the flat prefabricated elements.

SUMMARY

Systems for drywall application are provided which simplify the installation of interior walls by substantially eliminating the need for a final skim coat on the drywall. In one embodiment, an interior construction system is provided comprising one or more prefabricated drywall elements; at least one skim coat deposited on the one or more prefabricated drywall elements from a coating formulation comprising water, a binder, a mineral filler and a noncellulosic thickener; and at least one jointing material for assembling the one or more prefabricated drywall elements by jointing the drywall elements to form a substantially plane outer surface, wherein the jointing material, when dry, substantially matches the skim coat.

In a further embodiment, a method for the construction of interior walls is provided comprising assembling skim coated prefabricated drywall elements, wherein the skim coated prefabricated drywall elements have a coating layer of at least one skim coat deposited on the prefabricated elements by a coating device, the skim coat formed from a coating formulation comprising water, a binder, a mineral filler, and a noncellulosic thickener; jointing adjacent prefabricated elements with at least one jointing material wherein the jointing material, when dry, substantially matches the skim coat; and drying the jointing material.

In a further embodiment, an interior construction system is provided comprising one or more prefabricated drywall elements; at least one skim coat deposited on the one or more prefabricated drywall elements from a coating formulation comprising water, a binder, a mineral filler and a noncellulosic thickener; and at least one jointing material for assembling the one or more prefabricated drywall elements by jointing the drywall elements to form a substantially plane outer surface, the jointing material comprising substantially the same solids as the coating formulation, wherein the amount of water in the jointing material is from about 10% to about 60% less than the amount of water in the coating formulation.

In a further embodiment, a method for the construction of interior walls is provided comprising assembling skim coated prefabricated drywall elements, wherein the skim coated prefabricated drywall elements have a coating layer of at least one skim coat deposited on the prefabricated elements by a coating device, the skim coat formed from a coating formulation comprising water, a binder, a mineral filler, and a noncellulosic thickener; jointing adjacent prefabricated elements with at least one jointing material, the jointing material comprising substantially the same solids as the coating formulation, wherein the amount of water in the jointing material is from about 10% to about 60% less than the amount of water in the coating formulation; and drying the jointing material.

In a further embodiment, an interior construction system is provided comprising one or more prefabricated drywall elements; at least one skim coat deposited on the one or more prefabricated drywall elements from a coating formulation comprising water, a binder, a mineral filler and a noncellulosic thickener; and at least one jointing material for assembling the one or more prefabricated drywall elements by jointing the drywall elements to form a substantially plane outer surface, the jointing material comprising about 25 to about 45% water, about 40 to about 70% of a mineral filler which is the same or different from the mineral filler of the coating formulation, about 1.0 to about 3.0% anti-cracking agent, about 1.0 to about 4.0% clay, about 0.1 to about 1.0% thickener and water retention agent, about 1.0 to 5.0% talc, about 0.5 to about 20% of a binder which is the same or different from the binder of the coating formulation, and about 0.1 to about 1.0% starch.

In a further embodiment, a method for the construction of interior walls is provided comprising assembling skim coated prefabricated drywall elements, wherein the skim coated prefabricated drywall elements have a coating layer of at least one skim coat deposited on the prefabricated elements by a coating device, the skim coat formed from a coating formulation comprising water, a binder, a mineral filler, and a noncellulosic thickener; jointing adjacent prefabricated elements with at least one jointing material wherein the jointing material comprises about 25 to about 45% water, about 40 to about 70% of a mineral filler which is the same or different from the mineral filler of the coating formulation, about 1.0 to about 3.0% anti-cracking agent, about 1.0 to about 4.0% clay, about 0.1 to about 1.0% thickener and water retention agent, about 1.0 to 5.0% talc, about 0.5 to about 20% of a binder which is the same or different from the binder of the coating formulation, and about 0.1 to about 1.0% starch; and drying the jointing material.

An interior construction system is provided comprising one or more prefabricated drywall elements; at least one skim coat deposited on the one or more prefabricated drywall elements from a coating formulation comprising water, a binder, a mineral filler and a noncellulosic thickener; and at least one jointing material for assembling the one or more prefabricated drywall elements by jointing the drywall elements to form a substantially plane outer surface, wherein the jointing material comprises 50 to 85% of a mineral filler which is the same or different from the mineral filler of the coating formulation; 1 to 20% of an organic binder dispersible in an aqueous phase; 1 to 15% of a silicate-based agent; 0.2 to 5% of a hydrophobic agent which is a silicone derivative; 0.05 to 5% of polyvinyl alcohol; and water to make up to 100%.

In a further embodiment, a method for the construction of interior walls is provided comprising assembling skim coated prefabricated drywall elements, wherein the skim coated prefabricated drywall elements have a coating layer of at least one skim coat deposited on the prefabricated elements by a coating device, the skim coat formed from a coating formulation comprising water, a binder, a mineral filler, and a non-cellulosic thickener; jointing adjacent prefabricated elements with at least one jointing material wherein the jointing material comprises 50 to 85% of a mineral filler which is the same or different from the mineral filler of the coating formulation; 1 to 20% of an organic binder dispersible in an aqueous phase; 1 to 15% of a silicate-based agent; 0.2 to 5% of a hydrophobic agent which is a silicone derivative; 0.05 to 5% of polyvinyl alcohol; and water to make up to 100%; and drying the jointing material.

DETAILED DESCRIPTION OF THE PREFERRED EMBODIMENTS

The coating and jointing material systems provided afford improved drywall installation efficiency and improvements in texture, absorption characteristics, sanding characteristics, processing characteristics and final performance characteristics. The coated drywall products produced using the coating formulations, jointing material and methods disclosed preferably provide a final surface for the drywall that in some embodiments substantially equals a level 5 skim-coated finish. The drywall finish levels as used herein refer to the Levels of Gypsum Board Finish of *GA 214-96: Recommended Levels of Gypsum Board Finish* published in 1996. A level 5 finish is typically recommended for areas where severe lighting conditions exist and areas that are to receive gloss, semi-gloss, enamel or non-textured flat paints.

As used herein, the term "drywall" means any wall structure especially for interior application, wherein the wall structure may be prefabricated or not prefabricated material and includes gypsum fiberboards, cement fiberboards, cement wallboards, plasterboards and the like. Drywall elements typically are made of a gypsum or plaster core sandwiched or faced in paper or cardboard and produced like sheets which may be fastened to wall frames such as with nails or screws. The drywall has a surface usually placed outwardly in an interior construction such that there is a visible outer surface or face ready to be decorated.

Conventionally, one of the sheets of paper used for making drywall elements has a dark color which can vary between a gray color and a chestnut color, since it is composed of cellulose fibers which have not undergone any particular purifying treatment. Traditionally, this so-called grey paper is obtained from unbleached chemical pulp and/or from mechanical pulp, and/or from thermomechanical pulp and/or from semi-chemical pulp. By mechanical pulp, it is usually meant a pulp obtained entirely by mechanical means from various raw materials, essentially wood, which can be provided by salvaged products originating from wood, such as old cardboard boxes, trimmings of kraft paper and/or old newspapers. Thermomechanical pulp means a pulp obtained by thermal treatment followed by a mechanical treatment of the raw material. By semi-chemical pulp is meant a pulp obtained by eliminating some of the non-cellulose components from the raw material by means of chemical treatment and requiring a subsequent mechanical treatment in order to disperse the fibers.

The other sheet of a drywall element has a visible face, called a lining face, which may be of a color generally lighter than the gray sheet. To obtain this lighter color, the layer or layers of this face are based on chemical pulp, if appropriately bleached, composed of recycled and/or new cellulose fibers, and/or on mechanical pulp, if appropriately bleached. By chemical pulp is meant a pulp obtained by eliminating a very large proportion of the non-cellulose components from the raw material by chemical treatment, for example, by cooking in the presence of suitable chemical agents, such as soda or bisulfites. When this chemical treatment is completed by bleaching, a large part of the colored substances is eliminated, as well as the substances which risk decomposing by ageing and giving unpleasant yellow shades associated with the presence of, for example, lignin. The coating provided preferably is applied to this face of the drywall; however, the coating may be applied to any type of paper or outer surface utilized in the manufacture of drywall, including printed paper and the like. The jointing material is applied upon installation to finish the construction of the interior walls using the coated drywall elements.

Generally, the coating is applied to all or a portion of the surface of the drywall either during prefabrication of the drywall elements or boards or after installation in the interior of a structure. The coating has a composition compatible with the jointing material and is applied as a skim coat or film coat of relatively low thickness on the visible surface of the drywall. One or more coats may be applied. The coating preferably provides a substantially homogeneous appearance to the drywall even after the joints are prepared as is known in the art. The characteristics of the coating are such that the coating and jointing materials utilized in the installation of drywall compatibly provide a substantially homogeneous appearance. The drywall installation is simplified since one or more layers of primer or paint or finishing coats are not required to complete the preparation of the wall for decoration. Specifically, in preferred embodiments, when the coating is applied to drywall, an additional skim coat or finishing coat is not required to obtain a level 5 finish.

The jointing materials described herein are used to complete the construction of the interior surface of the interior structure installed with coated drywall. The jointing material may be used for any purpose for which such materials are known such as jointing compounds, sealing coats, joint coats or joint-pointing coats.

After the coating and jointing material system has been applied to drywall, the jointing material jointing the skim coated drywall elements and the skim coated drywall elements form a substantially plane outer surface comprising a surface of the jointing material and a surface of the skim coated drywall elements. This surface may then be decorated as is known in the art by application of a paint or wallpaper covering.

The Coating Formulation

The coating provides a smoothing of the texture of the drywall such that the fibers typically seen under primer or paint after installation of the drywall are substantially covered. Moreover, the coating changes the characteristics of the drywall to provide a surface with an absorbance closer to the absorbance of the jointing material surface when dry, which surface is thus visually substantially uniform. The coating also provides a durable surface such that the sanding on the jointing material does not easily remove or damage the coating surface. Thus, the coating preferably provides a durable surface with a sufficiently smooth texture and absorbance to be substantially compatible with the jointing material.

The coating typically is a drying type coating and the coating formulation comprises water, mineral filler, binder and thickener. The coating preferably also includes a dispersant. The coating is described in detail herein and also in the copending application entitled "Coating for Wall Construction", filed on even date herewith and coassigned with the present application, incorporated by reference herein in its entirety.

The water is provided in an amount effective to provide a suitable viscosity to the coating formulation such that the coating formulation may be applied by any desirable means to the drywall material.

The mineral filler may be any of the fillers known in the art for use in surface coating compositions or a combination thereof. Preferably, the mineral filler is of light color, preferably white with a grain size or particle size distribution wherein the mean diameter D50 is between about 5 and about 35 μm, as determined by light scattering techniques. Too large a grain size of the filler gives rise to overall surface defects, such as a reflection of light radiation on the surface of the coat which is different from that on the surface of the drywall, bringing about differences in tone and brightness of the shade. Too large a grain size also gives rise to differences in physical appearance which are associated with the differences in roughness between the board and the coating.

Preferably, the mineral filler comprises more than about 60% calcium carbonate, more preferably more than about 75%, and most preferably greater than about 90% calcium carbonate. Other fillers may also be used in lesser amounts, such as magnesium carbonate, dolomite, gypsum, anhydrite and the like. By way of example, calcium carbonate filler such as Pulpro 15 from OMYA may be used. The mineral filler represents about 40 to about 70% of the total weight of the coating formulation. Preferably, the mineral filler represents about 45 to about 65% of the total weight of the coating formulation.

The coating formulation preferably further comprises a dispersant. The dispersant provides cohesion for the formulation, holding the components of the formulation in suspension even where the viscosity of the coating formulation is relatively low for a coating material. The dispersant may include any dispersant or mixtures thereof which function as desired, preferably any polyacrylate or polymeric acrylic salt or mixtures thereof, more preferably a salt of polyacrylate such as a sodium polyacrylate. By way of example, Acumer® 9300 or Acumer® 9400 produced by Rohm and Haas Company may be used.

The dispersant preferably represents about 0.5 to about 15.0% of the total weight of the coating formulation. More preferably, the dispersant represents about 1.0 to about 5.0% of the total weight of the coating formulation.

The coating formulation also comprises an organic binder dispersible in aqueous phase, in a proportion of between about 0.5 and about 30%, preferably about 0.5 and about 15.0%, and more preferably between about 1.0 and about 4.0%, of the total weight of the coating formulation. The binder preferably imparts sufficient flexibility to the coat to withstand mechanical stresses, and has both an adhesive capacity for obtaining a good bond on the overall surface and good resistance to attacks of ultraviolet light. In addition, the binder typically will function to harden the surface of the coating after application.

The binder in the coating formulation preferably will be a latex binder, or a mixture of such binders. In a preferred embodiment, the binder is an acrylic latex binder. By way of example, an acrylic latex such as AC-630 from Rohm and Haas Company may be used.

The coating formulation further comprises a thickening agent which provides an increase in viscosity and functions to aid in holding the components of the coating formulation in suspension. The thickening agent preferably is primarily a noncellulosic thickener or a mixture of noncellulosic thickeners. In some embodiments, other thickeners known in the art such as cellulosic thickeners may be included in the formulation as part of a mixture of thickening agents.

By way of example, noncellulosic thickeners generally identified as alkali soluble emulsions or hydrophobically modified alkali soluble emulsions may be used. More preferably, the thickener is a polymeric noncellulosic thickener such as a polyacrylate, especially a copolymer of an acrylic acid and an acrylic ester. In a most preferred embodiment, the thickener is a copolymer of acrylate and methacrylic acid. By way of example, ASE-60, a polyacrylate of the alkali soluble emulsion category, or TT-615, a polyacrylate of the hydrophobically modified alkali soluble emulsion category, both from Rohm and Haas Company, may be used.

The thickener generally is used in a proportion of about 0.05 to about 50%, and preferably of about 0.1 to about 5.0%, of the total weight of the coating formulation.

In addition to the water, mineral filler, dispersant, binder and thickener, at least one workability agent may be included in the composition of the coating formulation, especially a clay, in the proportion of about 0.1 to about 5.0%, and preferably of about 1.0 to about 2.0%, of the total weight of the coating formulation. The workability agent is preferably one or more silicate derivatives and, more preferably, a clay of the attapulgite type, such as M8214 from Engelhard.

An anti-cracking material may also be desirable in the coating formulations. Such materials are known in the art and may include materials such as mica. By way of example, MW 200 from Oglebay Norton may be used. The anti-cracking agent may represent about 0.1 to about 20% of the total weight of the coating formulation. Preferably, the anti-cracking agent will represent about 1.0 to about 2.0% of the total weight of the coating formulation.

Other components, such as biocides, anti-foaming agents, preservatives, water treatment agents and pigments may also be incorporated in the composition of the coating formulation in the conventional way. For example, a water treatment agent may be needed to adjust the pH of the coating formulation depending on the water used or the ultimate use of the formulation. Such water treatment agent may be bicarbonate, which may be used in certain embodiments to ensure the pH is above about 8. Preservatives are known in the art and include such materials as hexahydro-1,3,5-tris(2-hydroxyethyl)-s-triazine. By way of example, Troysan 165 from Troy Corporation may be used. The additional components such as biocides, anti-foaming agents, preservatives, water treatment agents and pigments are typically used in relatively minor amounts, generally less than about 1.0% of the of the total weight of the coating formulation.

The coating formulation, by way of example, may be prepared by combining a first fraction of water with the binder and dispersant and mixing the combination. If a water treatment agent such as bicarbonate is to be added, such agent may be included in the first mixing step. The viscosity of the formulation should be kept as high as possible for as long as possible in order to effectively optimize the mixing process.

After sufficiently mixing the binder and dispersant with the first fraction of water, the mineral filler such as calcium carbonate is added, followed by the mica and the clay. If a preservative is to be used, the preservative may be added in this step, along with other optional components known to those of skill in the art. The coating formulation is further mixed prior to addition of the thickener. The remaining water preferably is added last; however, if the coating formulation mixture after addition of the mineral filler has a high viscosity, e.g., the coating formulation mixture is too thick, some water may be added prior to adding the thickener. Any water remaining may be added after addition of the thickener.

Typically, the viscosity of the coating formulation will be about 250 to about 1200 cps, more preferably about 300 to about 450 cps, as determined by a Brookfield viscometer at room temperature. By way of example, the viscosity may be measured for the coating formulation using T-bar spindle number S91 with 100 rpm. The viscosity of a jointing material may be measured, for example, using T-bar spindle number S94 with 2.5 rpm. The viscosity may be adjusted by any means known in the art to provide a coating formulation suitable for the desired application.

The coating formulation preferably is used on prefabricated drywall elements, preferably flat prefabricated elements such as gypsum fiberboards, cement fiberboards, gypsum wallboards, plaster boards and the like.

The coating formulation preferably is applied as a skim coat, or film coat of relatively low thickness on the outer surface of drywall made from prefabricated elements. The coat may be applied before or after the drywall is sent through a drier. Preferably, however, the coat will be applied prior to the drier so that the coat may be dried as the core is dried.

The skim coat may be applied, by way of example, in the plant by, for instance, roll coating, curtain coating, vacuum coating, spraying or the like via a coating device, on the prefabricated element so that the skim-coated prefabricated element is delivered to the assembly site already with a skim coat on it. Alternatively, the coating formulation may be supplied to the user for application to the drywall or boards after the drywall or boards are placed into position during interior construction. The skim coat from the coating formulation provides a substantially uniform surface with the joint compound used to install the drywall or boards upon which the skim coat is placed.

The coating formulation preferably is applied using a spraying device, which is operated under standard conditions for coating a product onto a board. The dimensions, rotating speed, feeding, temperature, and any other operating conditions are within the skill of a person of ordinary skill in the art. In a preferred embodiment, the coating is applied by a system as disclosed in the copending application entitled "Coating Spray Apparatus and Method of Using Same", filed on Apr. 13, 2004, and coassigned with the present application, incorporated by reference herein in its entirety.

By way of example, drywall material such as gypsum board is prepared according to standard practices, including depositing a calcined gypsum slurry between two sheets. Methods of producing gypsum board, including coated gypsum board, are described for example in copending, coassigned U.S. patent application Ser. No. 10/625,624, filed Jul. 24, 2003, incorporated herein by reference in its entirety. The coating formulation may be applied after the gypsum sets but prior to the gypsum being completely dry. Thereafter, the gypsum wallboard is dried in conventional driers which dries both the coating and the gypsum. It has been discovered that the coating is sufficiently permeable to allow moisture in the gypsum to be satisfactorily eliminated through the paper and the coating thereon. An impermeable substance applied to the paper cover sheet of the gypsum wallboard when the core is still wet may cause the paper sheet to separate or delaminate from the core as moisture is driven off in the drier. The coating formulation provided, however, may be advantageously applied during manufacture of the drywall without substantially negatively affecting the drying characteristics of the core material or time required for drying the core material.

The final thickness of the coat from the coating formulation, as determined when dry, is generally between about 5 and about 60 mil, preferably between about 10 and about 15 mil.

The selection of the jointing material used with the coating may be made such that the jointing material, when dry, substantially matches the coating on the drywall element or board. Since the composition of the jointing material and the coat are adapted to match each other, the jointing material and the coat form, both in a dry state, a substantially homogeneous outer surface having over substantially all its surface at least one of the parameters comprised in the group consisting of coloration, reflectance factor and surface water absorption which is substantially homogeneous over the surface. For instance, the at least one of the parameters differs by no more than 10%, preferably no more than 5%, at different parts of the overall surface, so that at least 90%, preferably at least 95%, homogeneity is achieved. In other words, as an example, when the jointing material and the prefabricated elements are dry, the at least one of the parameters of the visible surface of the jointing material can differ by not more than 10%, preferably not more than 5%, from the corresponding parameter of the visible surface of the prefabricated elements.

The characteristics of the surfaces may be compared by the following tests: (A) Color. The color deviations delta $E^*$ are measured on a spectro-colorimeter according to the standard DIN 6174 at an angle of 8°, illuminant D65 as a bright specular, included in the system $L^*$, $a^*$, $b^*$, in which $L^*$ is the luminance, $a^*$ represents the transition from green to red, and $b^*$ represents the transition from blue to yellow. A point $E^*$ in this system, the said point being a function of $L^*$, $a^*$, $b^*$, defines the colorimetry of a sample and the deviation is measured in relation to a reference point. In general terms, a color deviation beyond 2 becomes discernible to the naked eye. (B) Degree of whiteness or reflectance factor R obtained according to standard NFQ 03038 with a wavelength of 457 nm. This degree represents the a reflected radiation of the body in question and that of a perfect diffuser under the same conditions. Preferably the whiteness is between 70 and 80%, most preferably between 72 and 76%. (C) Surface water absorption determined by the drop test. A drop of distilled water of a volume of approximately 0.05 $cm^3$ at 23° C. is deposited on the surface (conditioned atmosphere). It is important that the drop be deposited and not allowed to fall from a variable height which consequently would crush it to a greater or lesser extent, thus falsifying the result. The duration in minutes (time for the glossy surface to disappear) represents the surface absorption of the tested area.

According to a preferred embodiment, the jointing material and the coating exhibit substantially the same surface water absorption or absorbability. In one embodiment, the surface water absorption, as measured by the drop test, is at least 45 minutes for both the joint and the board, preferably at least 60 minutes. Preferably, the jointing material and the coating exhibit also substantially the same coloration and/or reflectance factor.

A suitable jointing material may be selected according to the preceding description and/or may be selected from the embodiments of jointing material set forth below.

Jointing Material—Preferred Embodiment No. 1

In one embodiment, the jointing material preferably used with the coating described is derived from the components of the coating formulation. Thus, the jointing material in this embodiment comprises water, mineral filler, binder, thickener, and optionally, dispersant. This jointing material provides a substantially similar surface as the coating as to texture and absorbance, enabling the coating and jointing material when dry to preferably provide a level 5 finish without application of a skim or final coat. Thus, a final skim coat may be eliminated from the preparation of the wall, saving time and money when constructing interior walls.

The jointing material of this embodiment preferably is formulated to comprise substantially the same components as the coating formulation, with variations in the amounts of each component according to the desired characteristics. Since the jointing material and the coating formulation comprise substantially the same components, the properties of the coating and jointing material are compatible and preferably provide the desired substantially homogeneous surface for the drywall construction.

Preferably, the jointing material of this embodiment will comprise about 40 to about 70% mineral filler, wherein the mineral filler is greater than about 60% calcium carbonate, about 0.5 to about 30% binder, about 0.05 to about 50% noncellulosic thickener, optionally about 0.5 to about 15.0% dispersant, about 0.1 to about 5.0% workability agent and about 0.1 to about 20% anti-cracking agent, all by weight. Other components may also be present in minor amounts as discussed for the coating formulation. Water is provided in an amount to make up 100% of the jointing material.

Water is present in the jointing material in an amount effective to provide a suitable viscosity to the jointing material such that the jointing material may be applied by any desirable means to effect assembly of the drywall elements. Since the jointing material typically has a higher viscosity than a coating composition, the jointing material will preferably include less water than the coating formulation. The coating formulation may, in a preferred embodiment, be a diluted version of the jointing material. For example, compared to the jointing material such as the joint-pointing coat, the coating, when applied (for example, when the coating is applied to the prefabricated elements, or when the skim coated prefabricated elements are assembled), will comprise more water than initially present in the jointing material. It will thus generally comprise additional water, e.g., about 10 to 60%, preferably about 15 to 40%, more preferably about 25%, more water than initially present in the jointing material. By "water initially present in the jointing material", it means the amount of water present in the jointing material when the jointing material is applied to the skim coated prefabricated elements, before the jointing material is in a dry state.

In a most preferred embodiment, the jointing material and the coating formulation preferably have substantially the same solids formulation, the coat when applied having a solids content lower than the jointing material when applied. Thus, in this preferred embodiment, substantially the same filler, binder, thickener and other optional components of the coating formulation are present in the jointing material.

Jointing Material—Preferred Embodiment No. 2

In another embodiment, a jointing material comprising water, mineral filler, binder, thickeners and rheologic agents, and an anti-cracking agent is provided.

The filler may be any of the fillers known for jointing materials such as such as calcium carbonate, magnesium carbonate, dolomite, gypsum, anhydrite and the like, including combinations thereof. Preferably, the filler will comprise at least about 60% calcium carbonate. The filler, by way of example, may by Pulpro 15.

The binder may be an acrylic polymer typically used as a binder. One example of a suitable binder is AC630 from Rohm and Haas Company.

The thickeners and rheologic agents may be selected from one or more silicate compounds or from starches. Particularly, one or more clays, such as attapulgite, may be used. By way of example, Engelhard M8214 or Attagel 30 may be used. Another silicate, talc, may also preferably be used as a rheologic agent, preferably in conjunction with one or more clay components. For example, Luzenac TC100 may be used. Starch may also preferably be used as an additional thickener and rheologic agent. As an example, Starpol 136, 767 or 600, amylopectin hydrogen phosphate 2-hydroxypropyl ether, may be used. In a most preferred embodiment, the jointing material includes each of a clay, talc and a starch as rheologic and thickening agents.

Preferably, a thickener and water retention agent is also used, such as a cellulose compound or mixture of cellulose compounds. Suitable cellulose compounds include hydroxypropyl methylcellulose compounds such as Dow Chemical Methocel 240S, Methocel 40320 or Samsung PMC40US.

The anti-cracking agent may be any agent known for this purpose. Preferably, the anti-cracking agent is mica such as Georgia Mineral SG75 or Oglebay Norton MW200.

Preferably, the jointing material comprises:
water—about 25 to about 45%
filler—about 40 to about 70%
anti-cracking agent—about 1.0 to about 3.0%
clay—about 1.0 to about 4.0%
thickener and water retention agent—about 0.1 to about 1.0%
talc—about 1.0 to 5.0%
binder—about 0.5 to about 20%,
  preferably about 0.5 to about 3.0%
starch—about 0.1 to about 1.0

Jointing Material—Preferred Embodiment No. 3

In another embodiment, the jointing material described in U.S. Patent Application Publication No. 2003/0153651, incorporated herein by reference in its entirety, may be employed as the jointing material.

The jointing material or plaster described in the '651 publication is directed to a composition of
50 to 85% of a mineral filler;
1 to 20% of an organic binder dispersible in an aqueous phase;
1 to 15% of a silicate-based agent;

0.2 to 5% of a hydrophobic agent which is a silicone derivative;

0.05 to 5% of polyvinyl alcohol; and water to make up to 100%.

As mineral filler, any mineral filler commonly employed for the manufacture of a jointing compound or plaster may be used. In general, the mineral filler will be light in colour, preferably white, and the mean diameter $d_{50}$ of which is in general between 5 and 35 microns as determined by light scattering techniques, so that the jointing material after drying gives a smooth finish corresponding to that of the facing of the board.

As examples of mineral filler, mention may be made of calcium carbonate, anhydrous or dihydrated calcium sulphate, magnesium carbonate, dolomite, silicas, silicates, aluminates and other such materials.

Preferably, calcium carbonate $CaCO_3$ is used.

The mineral filler preferably represents between 50 and 70% of the total weight of the jointing material.

According to one embodiment, the binder/silicate-based agent weight ratio is between 0.5 and 2.

According to one embodiment, the binder/hydrophobic agent weight ratio is between 1.5 and 10.

According to an advantageous embodiment, the mineral filler furthermore includes perlite, preferably expanded and even more preferably hydrophobic perlite. The amount of perlite is then generally between 2 and 5%.

As organic binder dispersible in an aqueous phase, mention may be made of polyvinyl acetate homopolymers (plasticized or unplasticized), ethylene/vinyl acetate copolymers (plasticized or unplasticized EVAs), ethylene/vinyl versatate copolymers, vinyl acetate/vinyl versatate copolymers, polyacrylics, vinyl acetate/acrylic copolymers, styrene/acrylic copolymers, styrene/butadiene copolymers, vinyl acetate/vinyl versatate/vinyl maleate terpolymers, vinyl acetate/vinyl versatate/acrylic terpolymers, acrylic terpolymers, acrylic polymers or monopolymers, and blends thereof.

The proportion of organic binder is preferably between 2 and 12% of the total weight of the jointing material.

The silicate-based agent (different from the mineral filler) preferably comprises talc and/or mica and/or a clay. Preferably, a mixture of talc and mica is used.

The proportion of silicate-based agent is preferably between 3 and 10% of the total weight of the jointing material.

The hydrophobic agent is a silicone derivative. As silicone derivatives, mention may be made of siliconates, silanes, hydrogenated silicone oils, silicone emulsions, aminosilicone emulsions, alkylsiloxane resins, such as hydrogenomethyl-polysiloxane and aminated polydimethyl-siloxane, and mixtures thereof.

Preferably, a resin of the aminated polydimethyl-siloxane type is used as silicone derivative.

The proportion of silicone derivative is preferably between 0.5 and 3% of the total weight of the jointing material.

Advantageously, the proportion of silicone derivative is chosen so as to allow a joint to be produced which has the same surface properties as those of the facing paper. These surface properties are decolouration or colouration owing to the effect of the natural color, reflectance and surface water absorption. These properties are described above.

The proportion of polyvinyl alcohol is preferably between 0.05 and 1% of the total weight of the jointing material.

According to an advantageous embodiment, the jointing material furthermore includes starch and/or a starch derivative.

The proportion of starch and/or starch derivative is in general between 0.05 and 5%, preferably between 0.1 and 1%, of the total weight of the jointing material.

The jointing material may be prepared by mixing its constituents in any order.

Of course, provided that the proportions assigned to each of the essential constituents are respected, it is possible to introduce into the jointing material according to the invention, as secondary ingredients, additives normally used to facilitate the processing of the other constituents or for conferring additional particular properties on the jointing material. By way of examples of such additives, mention may be made of water-retaining agents or thickeners, slip agents, dispersants, antigels, pigments, biocides and antifoams. These additives are described, for example, in the application WO-A-9702395, incorporated herein by reference.

Embodiments of the invention will now be more fully explained by the following examples. However, the scope of the invention is not intended to be limited to these examples.

EXAMPLE 1

A coating formulation according to an embodiment as set forth in Table 1 was prepared as follows:

To the first part of the water, bicarbonate, binder, and dispersant were added and mixed. The calcium carbonate was then added and mixed, followed by the mica, clay and preservative, which were also mixed. The thickener then was added and mixed into the formulation. The remaining water was added after the thickener was mixed into the formulation.

TABLE 1

| Material Name | Pounds | Dry Solids | % |
|---|---|---|---|
| Water | 294.68 | | 21.8 |
| Bicarbonate | 0.42 | 100 | 0.03 |
| AC-630 resin, binder (acrylic latex) | 25.79 | 50 | 1.91 |
| Acumer 9400, dispersant (sodium polyacrylate) | 27.09 | 42.5 | 2.00 |
| Calcium carbonate | 771.28 | 100 | 57.06 |
| Mica | 26.43 | 100 | 1.96 |
| Clay | 19.32 | 100 | 1.43 |
| ASE-60, thickener (copolymer acrylate and methacrylic acid) | 1.62 | 28 | 0.12 |
| Water | 185.00 | | 13.6 |
| Total Pounds | 1351.63 | | |
| Weight solids (%) | | | 61.40 |
| % Dispersant - total formulation | | | 2.00 |
| % thickener - total formulation | | | 0.12 |
| % binder - total formulation | | | 1.91 |

EXAMPLE 2

A coating formulation according to Table 2 was prepared according to the procedures of Example 1.

TABLE 2

| Material Name | Pounds | Dry Solids | % |
|---|---|---|---|
| Water | 297.56 | | 21.80 |
| Bicarbonate | 0.43 | 100 | 0.03 |
| AC-630 resin, binder (acrylic latex) | 26.25 | 50 | 1.92 |
| Acumer 9300, dispersant (sodium polyacrylate) | 27.38 | 45 | 2.00 |
| Calcium carbonate | 784.89 | 100 | 57.51 |
| Mica | 26.90 | 100 | 1.97 |
| Clay | 19.66 | 100 | 1.44 |
| TT-615, thickener (copolymer acrylate and methacrylic acid) | 1.64 | 30 | 0.12 |

TABLE 2-continued

| Material Name | Pounds | Dry Solids | % |
|---|---|---|---|
| Water | 180.00 | | 13.19 |
| Total Pounds | 1364.71 | | |
| Weight solids (%) | | | 61.90 |
| % Dispersant - total formulation | | | 2.00 |
| % thickener - total formulation | | | 0.12 |
| % binder - total formulation | | | 1.92 |

EXAMPLE 3

A jointing material according to preferred embodiment no. 2 was prepared with the following composition:
water—33.0%
limestone (CaCO$_3$)—57.0%
mica—2.0%
clay attapulgite—2.5%
hydroxypropyl methylcellulose—0.5%
talc—3.0%
acrylic polymer—1.5%
starch—0.5%

While the preferred embodiments of the invention have been disclosed in detail, it will be apparent to one skilled in the art that various changes and modifications can be made without departing from the spirit and scope thereof.

What is claimed is:

1. An interior construction system comprising:
one or more prefabricated drywall elements;
at least one skim coat deposited on the one or more prefabricated drywall elements from a coating formulation comprising water, a binder present in an amount of between about 1.0% and about 4.0% by weight, a mineral filler having a mean diameter between about 5 and about 35 µm, and a polymeric noncellulosic thickener, wherein the polymeric noncellulosic thickener is a polyacrylate, and wherein the coating formulation does not contain any cellulosic thickener; and
at least one jointing material for assembling the one or more prefabricated drywall elements by jointing the drywall elements to form a substantially planar outer surface, wherein the jointing material, when dry, substantially matches the skim coat, and wherein the jointing material comprises a thickener and a water retention agent.

2. The system of claim 1, wherein the at least one jointing material and at least one skim coat form a substantially homogeneous outer surface on the substantially planar outer surface.

3. The system of claim 1, wherein at least one of the parameters in the group consisting of coloration, reflectance factor and surface water absorption is substantially homogeneous over the substantially planar outer surface.

4. The system of claim 1, wherein the at least one jointing material and the at least one skim coat exhibit substantially the same surface water absorption when dry.

5. The system of claim 3, wherein the surface water absorption, as measured by the drop test, is at least 45 minutes for both the jointing material and the skim coat.

6. The system of claim 1, wherein the coating formulation further comprises about 0.5 to about 15.0% by weight dispersant, about 0.1 to about 20% by weight anti-cracking agent and about 0.1 to about 5% by weight workability agent.

7. The system of claim 6, wherein the anti-cracking agent is mica and the workability agent is clay.

8. The system of claim 1, wherein the mineral filler comprises more than about 60% calcium carbonate.

9. The system of claim 1, wherein the drywall elements are gypsum wallboard.

10. A method for the construction of interior walls comprising:
assembling skim coated prefabricated drywall elements, wherein the skim coated prefabricated drywall elements have a coating layer of at least one skim coat deposited on the prefabricated elements by a coating device, the skim coat formed from a coating formulation comprising water, a binder present in an amount of between about 1.0% and about 4.0% by weight, a mineral filler having a mean diameter between about 5 and about 35 µm, and a polymeric noncellulosic thickener, wherein the polymeric noncellulosic thickener is a polyacrylate, and wherein the coating formulation does not contain any cellulosic thickener;
jointing adjacent prefabricated elements with at least one jointing material wherein the jointing material, when dry, substantially matches the skim coat, and wherein the jointing material comprises a thickener and a water retention agent; and
drying the jointing material.

11. The method of claim 10, wherein the at least one jointing material and the at least one skim coat form, in the dry state, a substantially homogeneous outer surface.

12. The method of claim 11, wherein at least one of the parameters in the group consisting of coloration, reflectance factor and surface water absorption is substantially homogeneous over the substantially homogeneous outer surface.

13. The method of claim 10, wherein the at least one jointing material and the at least one skim coat exhibit substantially the same surface water absorption when dry.

14. The method of claim 12, wherein the surface water absorption, as measured by the drop test, is at least 45 minutes for both the jointing material and the skim coat.

15. The method of claim 10, wherein the coating formulation further comprises about 0.5 to about 15.0% by weight dispersant, about 0.1 to about 20% by weight anti-cracking agent and about 0.1 to about 5% by weight workability agent.

16. The method of claim 15, wherein the anti-cracking agent is mica and the workability agent is clay.

17. The method of claim 10, wherein the mineral filler comprises more than about 60% calcium carbonate.

18. The method of claim 10, wherein the drywall elements are gypsum wallboard.

19. An interior construction system comprising:
one or more prefabricated drywall elements;
at least one skim coat deposited on the one or more prefabricated drywall elements from a coating formulation comprising water, a binder present in an amount of between about 1.0% and about 4.0% by weight, a mineral filler having a mean diameter between about 5 and about 35 µm, and a polymeric noncellulosic thickener, wherein the polymeric noncellulosic thickener is a polyacrylate, and wherein the coating formulation does not contain any cellulosic thickener; and
at least one jointing material for assembling the one or more prefabricated drywall elements by jointing the drywall elements to form a substantially planar outer surface, the jointing material comprising about 25 to about 45% water, about 40 to about 70% of a mineral filler which is the same or different from the mineral filler of the coating formulation, about 1.0 to about 3.0% anti-cracking agent, about 1.0 to about 4.0% clay, about 0.1 to about 1.0% thickener and water retention agent, about 1.0 to 5.0% talc, about 0.5 to about 20% of a binder which is the same or different as the binder of the coating formulation, and about 0.1 to about 1.0% starch.

20. The system of claim 19, wherein the at least one jointing material and at least one skim coat form a substantially homogeneous outer surface on the substantially planar outer surface.

21. The system of claim 19, wherein the surface water absorption, as measured by the drop test, is at least 45 minutes for both the jointing material and the skim coat.

22. The system of claim 19, wherein the coating formulation further comprises about 0.5 to about 15.0% by weight dispersant, about 0.1 to about 20% by weight anti-cracking agent and about 0.1 to about 5% by weight workability agent.

23. The system of claim 22, wherein the anti-cracking agent is mica and the workability agent is clay.

24. The system of claim 19, wherein the mineral filler in each of the coating formulation and the jointing material comprises more than about 60% calcium carbonate.

25. The system of claim 19, wherein the binder in the coating formulation and the binder in the jointing material is the same.

26. The system of claim 19, wherein the binder in the jointing material is an acrylic polymer.

27. The system of claim 19, wherein the drywall elements are gypsum wallboard.

28. A method for the construction of interior walls comprising:
assembling skim coated prefabricated drywall elements, wherein the skim coated prefabricated drywall elements have a coating layer of at least one skim coat deposited on the prefabricated elements by a coating device, the skim coat formed from a coating formulation comprising water, a binder present in an amount of between about 1.0% and about 4.0% by weight, a mineral filler having a mean diameter between about 5 and about 35 µm, and a polymeric noncellulosic thickener, wherein the polymeric noncellulosic thickener is a polyacrylate, and wherein the coating formulation does not contain any cellulosic thickener;
jointing adjacent prefabricated elements with at least one jointing material wherein the jointing material comprises about 25 to about 45% water, about 40 to about 70% of mineral filler which is the same or different from the mineral filler of the coating formulation, about 1.0 to about 3.0% anti-cracking agent, about 1.0 to about 4.0% clay, about 0.1 to about 1.0% thickener and water retention agent, about 1.0 to 5.0% talc, about 0.5 to about 20% of a binder which is the same or different as the binder of the coating formulation, and about 0.1 to about 1.0% starch; and
drying the jointing material.

29. The method of claim 28, wherein the at least one jointing material and the at least one skim coat form, in the dry state, a substantially homogeneous outer surface.

30. The method of claim 28, wherein the coating formulation further comprises about 0.5 to about 15.0% by weight dispersant, about 0.1 to about 20% by weight anti-cracking agent and about 0.1 to about 5% by weight workability agent.

31. The method of claim 30, wherein the anti-cracking agent is mica and the workability agent is clay.

32. The method of claim 28, wherein the mineral filler in each of the coating formulation and the jointing material comprises more than about 60% calcium carbonate.

33. The method of claim 28, wherein the binder in the coating formulation and the binder in the jointing material is the same.

34. The method of claim 28, wherein the binder in the jointing material is an acrylic polymer.

35. The method of claim 28, wherein the drywall elements are gypsum wallboard.

* * * * *